(12) United States Patent
Binfet et al.

(10) Patent No.: US 8,052,802 B2
(45) Date of Patent: Nov. 8, 2011

(54) REAR WIPER CONTROL METHOD WHEN COMBINED WITH FLIP UP GLASS

(75) Inventors: Michael Binfet, Bellefontaine, OH (US);
John Sgueglia, Columbus, OH (US);
Dave Peterson, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 853 days.

(21) Appl. No.: 12/062,548

(22) Filed: Apr. 4, 2008

(65) Prior Publication Data
US 2009/0106927 A1  Apr. 30, 2009

Related U.S. Application Data

(60) Provisional application No. 60/983,256, filed on Oct. 29, 2007.

(51) Int. Cl.
*B60S 1/58* (2006.01)
*B60S 1/08* (2006.01)

(52) U.S. Cl. ........ 134/18; 134/6; 15/250.16; 15/250.17; 15/250.3; 15/250.31; 15/250.19; 296/96.15; 296/96.2; 318/DIG. 2

(58) Field of Classification Search ............... 15/250.16, 15/250.3, 250.31, 250.19; 296/96.15, 96.2; 318/DIG. 2; 307/10.1
See application file for complete search history.

(56) References Cited

U.S. PATENT DOCUMENTS

| | | | |
|---|---|---|---|
| 4,728,870 A | 3/1988 | Hirano et al. | |
| 5,512,806 A | 4/1996 | Papazian et al. | |
| 5,519,258 A * | 5/1996 | Stroven et al. | 307/10.1 |
| 5,909,096 A * | 6/1999 | Detais | 318/282 |
| 6,240,593 B1 | 6/2001 | Murata | |
| 6,242,876 B1 | 6/2001 | Thompson | |
| 6,792,643 B1 | 9/2004 | Ponziani | |

* cited by examiner

*Primary Examiner* — Michael Barr
*Assistant Examiner* — Caitlin Dennis
(74) *Attorney, Agent, or Firm* — Mark E. Duell, Esq.; Emerson Thomson Bennett

(57) ABSTRACT

A rear wiper assembly that moves to a parked position located out of contact with the rear windshield upon the occurrence of a specified condition. Upon resuming the normal operation of the rear wiper assembly the rear wiper arm waits a first delay prior to moving to a flip position located on the rear windshield and then waits a second delay prior to resuming its normal oscillation across the rear windshield.

20 Claims, 16 Drawing Sheets

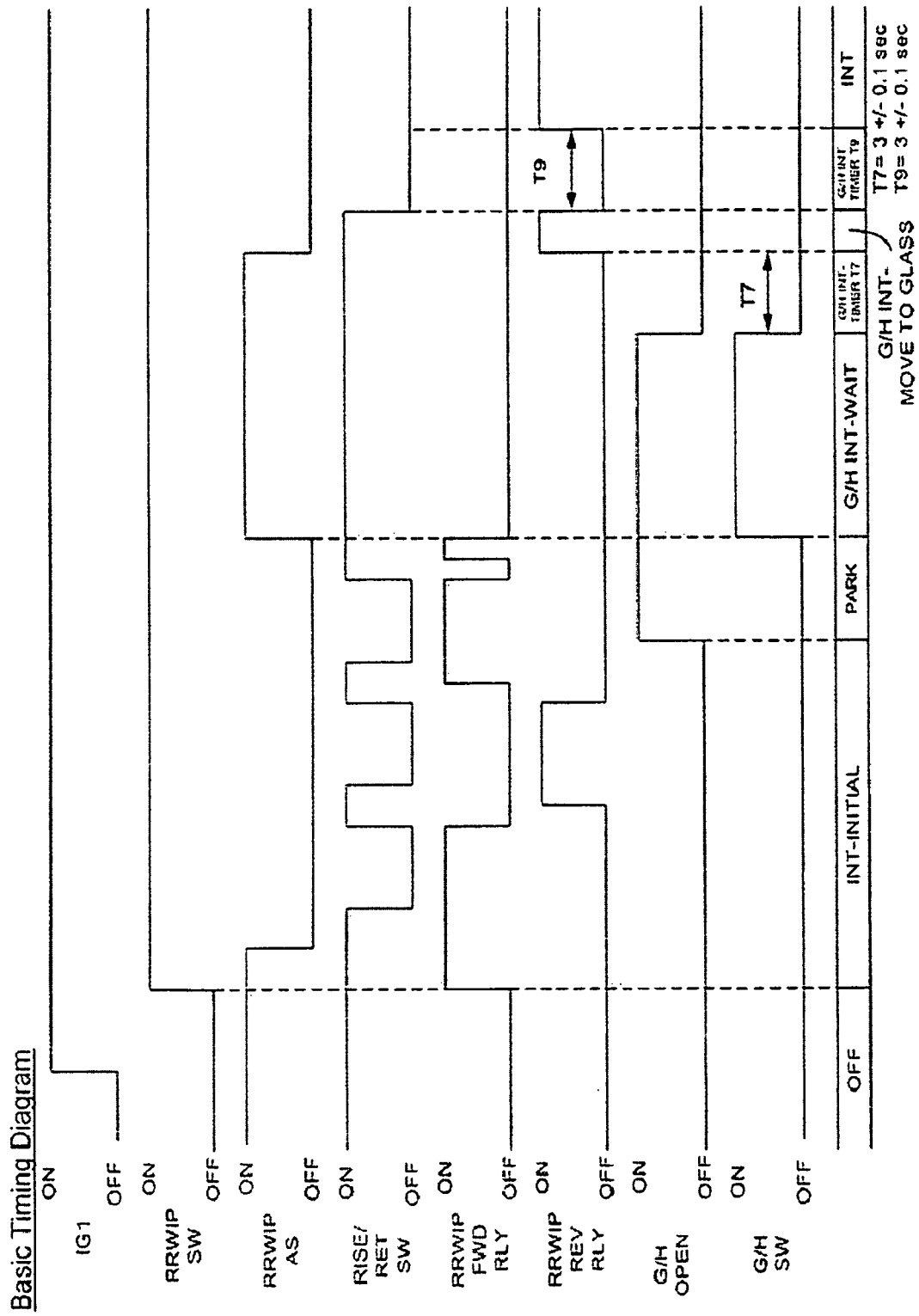

REAR WIPER CONTROL METHOD WHEN COMBINED WITH FLIP UP GLASS

This application claims priority to U.S. Ser. No. 60/983,256 entitled REAR WIPER CONTROL METHOD WHEN COMBINED WITH FLIP UP GLASS, filed Oct. 29, 2007, which is incorporated herein by reference.

I. BACKGROUND OF THE INVENTION

A. Field of Invention

This invention pertains to the art of methods and apparatuses regarding the manufacture and design of automobiles, and more particularly to methods and apparatuses regarding automobile rear wiper assemblies.

B. Description of the Related Art

It is known to manufacture a vehicle that includes a rear windshield. Often, the rear windshield is a "flip-glass" window or a rear windshield that can be opened independent of a rear-facing door or tailgate. Typically, the flip-glass window is pivotally connected to the rear-facing door or tailgate allowing an operator to conveniently access an interior storage or passenger compartment located in the rear portion of the vehicle from outside the vehicle without having to open the rear-facing door or tailgate. Commonly, the flip-glass window is used in combination with a rear wiper assembly. The rear wiper assembly comprises a wiper arm that oscillates across the flip-glass window in order to clear raindrops or other moisture as well as debris that may collect on the flip-glass window and impede the vehicle operator's rearward field of view.

It is known to "force park" the rear wiper arm of a rear wiper assembly when an operator attempts to open the flip-glass window, to open the rear-facing door or tailgate, or the operator moves the ignition to the OFF position while the rear wiper assembly is operating. Prior to utilizing known force park methods, often, if the operator attempted to open the flip-glass window, to open the rear-facing door or tailgate, or moved the ignition to the OFF position, the rear wiper arm would immediately stop operating while still in contact with the flip-glass window. Consequently, the operator would have to close the flip-glass window, which was now ajar, turn off the rear wiper assembly, and then attempt to re-open the flip-glass window. Therefore, a "forced park condition" may be said to occur when an operator attempts to open the flip-glass window, to open the rear-facing door or tailgate, or moves the ignition to the OFF position while the rear wiper assembly is operating. Force parking a rear wiper assembly then may refer to the method for ceasing operation of the rear wiper assembly and moving the rear wiper arm to a "parked position" or a position wherein the rear wiper arm is not in contact with the flip-glass window prior to opening the flip-glass window.

Conventionally, three methods or scenarios are known for dealing with the subsequent termination of the forced park condition. A first scenario entails the rear wiper assembly remaining in the parked position. In this first scenario, the operator must reset the rear wiper assembly by turning an operating switch to the off position and then back to an operating position in order for the rear wiper assembly to resume its normal operations. A second scenario requires that the rear wiper assembly immediately resume operating upon the termination of the forced park condition. A third scenario requires that the rear wiper assembly experiences a predetermined delay prior to resuming its normal operations. In both the second and third scenarios, the rear wiper arm resumes its normal operation by moving directly from the parked position without any warning to the operator indicating the resumption of normal operations.

Although known methods work well for their intended purpose, several disadvantages exist. One disadvantage relates to the positioning of a rear window handle and a rear window locking mechanism. It is desirable to place the rear wiper arm at an approximate center of the of the flip-glass window. By positioning the rear wiper arm at an approximate center of the flip-glass window, the effective clearing area of the rear wiper arm may be maximized. This placement of the rear wiper arm conflicts, however, with the placement of the rear window handle and rear window locking mechanism as it is also desirable to place both the rear window handle and rear window locking mechanism at an approximate center of the flip-glass window in order to ensure the proper sealing of the flip-glass window. Off-centered placement could result in improper sealing of the flip-glass window that would allow moisture and air to pass between the flip-glass window and the rear-facing door or tailgate causing undesirable leaking and wind noise. It is known to design the rear wiper arm with a curvature that allows the rear wiper arm to pass over the rear window handle and rear window locking mechanism while still providing a maximum effective clearing area. By resuming normal operation of the rear wiper assembly directly from the parked position, an operator is given no warning as to the impending resumption of operation. As a result, an operator may inadvertently leave their arm or hand in contact with or in close proximity to the rear window handle or the rear window locking mechanism. The operator's hand or arm may then be contacted and potentially injured by the rear wiper arm.

Another disadvantage is associated with the first scenario. Requiring the operator to reset the rear wiper assembly prior to the rear wiper assembly resuming its normal operations may lead to confusion as to why the rear wiper assembly is not functioning. An operator attempting to activate the rear wiper assembly after the termination of a forced park condition may notice that the operating switch is activated and the operator may therefore conclude that the rear wiper assembly is malfunctioning or broken because it is not operating. This confusion can lead to customer dissatisfaction and lower sales and is therefore generally undesirable. What is needed then is a rear wiper assembly that eliminates operator confusion and provides the operator adequate warning of an impending resumption of the normal operation of the rear wiper assembly after the termination of a forced park condition.

II. SUMMARY OF THE INVENTION

According to one embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The second timer causes a second delay. Upon the expiration of the second delay, the normal operation of the rear wiper assembly is resumed.

According to one embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The second timer causes a second delay. Upon the expiration of the second delay, if a second forced park condition has not occurred during either the first or the second delay, the normal operation of the rear wiper assembly is resumed.

According to one embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The second timer causes a second delay. The first delay extends for a longer period of time than the second delay. Upon the expiration of the second delay, if a second forced park condition has not occurred during either the first or the second delay, the normal operation of the rear wiper assembly is resumed.

According to one embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The first delay is about four seconds in duration. The rear wiper is moved into a fourth position upon the expiration of the first delay. In the fourth position, the rear wiper arm intersects the lower window edge of the flip-glass window at the third wiper arm angle. The second timer causes a second delay. The second delay is about three seconds in duration. Upon the expiration of the second delay, the normal operation of the rear wiper assembly is resumed.

According to one embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The first delay ranges from about one second to about five seconds in duration. The rear wiper is moved into a fourth position upon the expiration of the first delay. In the fourth position, the rear wiper arm intersects the lower window edge of the flip-glass window at the third wiper arm angle. The second timer causes a second delay. Upon the expiration of the second delay, the normal operation of the rear wiper assembly is resumed.

According to another embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The second timer causes a second delay. The second delay ranges from about one second to about five seconds in duration. Upon the expiration of the second delay, the normal operation of the rear wiper assembly is resumed.

According to another embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The second timer causes a second delay. The first delay and the second delay extend for substantially equal periods of time. Upon the expiration of the second delay, the normal operation of the rear wiper assembly is resumed.

According to another embodiment of this invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The third wiper arm angle is substantially the same as the first wiper arm angle. The second timer causes a second delay. Upon the expiration of the second delay, the normal operation of the rear wiper assembly is resumed.

According to another embodiment of the invention, a method has the steps of providing a vehicle, operating a rear wiper assembly, processing a plurality of input signals, detecting a first forced park condition based upon the plurality of input signals, moving the rear wiper arm to a third position, determining the termination of the first forced park condition, initiating a first timer, moving the rear wiper arm to a fourth position, initiating a second timer, and resuming the operation of the rear wiper assembly. The vehicle has a rear-facing door and a rear wiper assembly. In the rear-facing door has a flip-glass window. The flip-glass window is at least partially cleared of moisture or debris during the operation of the rear wiper assembly. The rear wiper assembly is operated by oscillating a room wiper arm between a first position and a second position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. The plurality of input signals are indicative of the vehicle admissions status, a flip-glass window status, and a rear-facing door status. In the third position, the rear wiper arm abuts the outer surface of the rear-facing door and is out of contact with the flip-glass window. The first timer causes a first delay. The rear wiper is moved into a fourth position upon the expiration of the first delay. In the fourth position, the rear wiper arm intersects the lower window edge of the flip-glass window at the third wiper arm angle. The first wiper arm angle is greater than the third wiper arm angle. The second timer causes a second delay. Upon the expiration of the second delay, the normal operation of the rear wiper assembly is resumed.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The second timer is then activated causing a second delay. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The second timer is then activated causing a second delay. The first delay extends for a longer period of time than the second delay. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The second timer is then activated causing a second delay. The first delay extends for a longer period of time. The first delay is about four seconds in duration and the second delay is about three seconds in duration. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. The first delay ranges from about one second to about five seconds in duration. Upon the expiration of the first delay, the rear wiper arm is moved to a fourth position. In the fourth position, the room wiper arm intersects lower window edge of the flip-glass window and a third wiper arm angle. The second timer is then activated causing a second delay. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The second timer is then activated causing a second delay. The second delay ranges from about one second to about five seconds in duration. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The third wiper arm angle is substantially the same as the first wiper arm angle. The second timer is then activated causing a second delay. Operation of the rear wiper assembly is resumed upon expiration of the second delay.

According to one embodiment of the invention, a vehicle has a rear-facing door, and a rear wiper assembly. The rear-facing door has a flip-glass window. The rear wiper assembly has a rear wiper arm, and actuator device, and a control portion. The rear wiper arm is for use in contacting an outer surface of the flip-glass window to clear the outer surface of the flip-glass window of moisture and debris. The actuator device is for use in moving the rear wiper arm. This control portion controls the operation of the actuator device, and thereby the position of the rear wiper arm. The control portion has a first timer, a second timer, a first sensor, and a second sensor. The first sensor senses the activation and deactivation of a first switch. The activation of the first switch causes the rear wiper arm to oscillate between a first position and a second position. The de-activation of the first switch causes the rear wiper arm to move to a third position. In the first position, the rear wiper arm intersects a lower window edge of the flip-glass window at a first wiper arm angle. In the second position, the rear wiper arm intersects the lower window edge of the flip-glass window at a second wiper arm angle. The second wiper arm angle is substantially equal to the oppositely oriented from the first wiper arm angle. In the third position, the rear wiper arm abuts an outer surface of the rear-facing door. The second sensor senses the activation and deactivation of a second switch. The activation of the second switch at least partially causes a flip-glass window to open independent of the rear-facing door. The second switch is deactivated upon the flip-glass window being fully closed. Upon the control portion sensing the activation of both the first switch and a second switch, the rear wiper arm is moved to the third position. Upon the control portion sensing the subsequent the activation of the second switch in the continuing activation of the first switch, the first timer is activated causing a first delay. Upon the expiration of the first delay, the rear wiper arm is moved to a fourth position. In the fourth position, the room wiper arm intersects lower window edge of the flip-glass window and a third wiper arm angle. The first wiper arm angle is greater than the third wiper arm angle. The second timer is then activated causing a second delay. Operation of the rear wiper assembly is resumed upon expiration of the second delay.

One advantage of this invention is that the operator receives a visual warning prior to the rear wiper assembly resuming its normal operations.

Another advantage of this invention is that it reduces operator confusion resulting from the rear wiper assembly's failure to resume normal operations upon termination of the forced park condition.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 16 is a graphical view of a basic timing diagram for a rear wiper assembly according to one embodiment of the invention.

IV. DETAILED DESCRIPTION OF THE INVENTION

Figure 1:
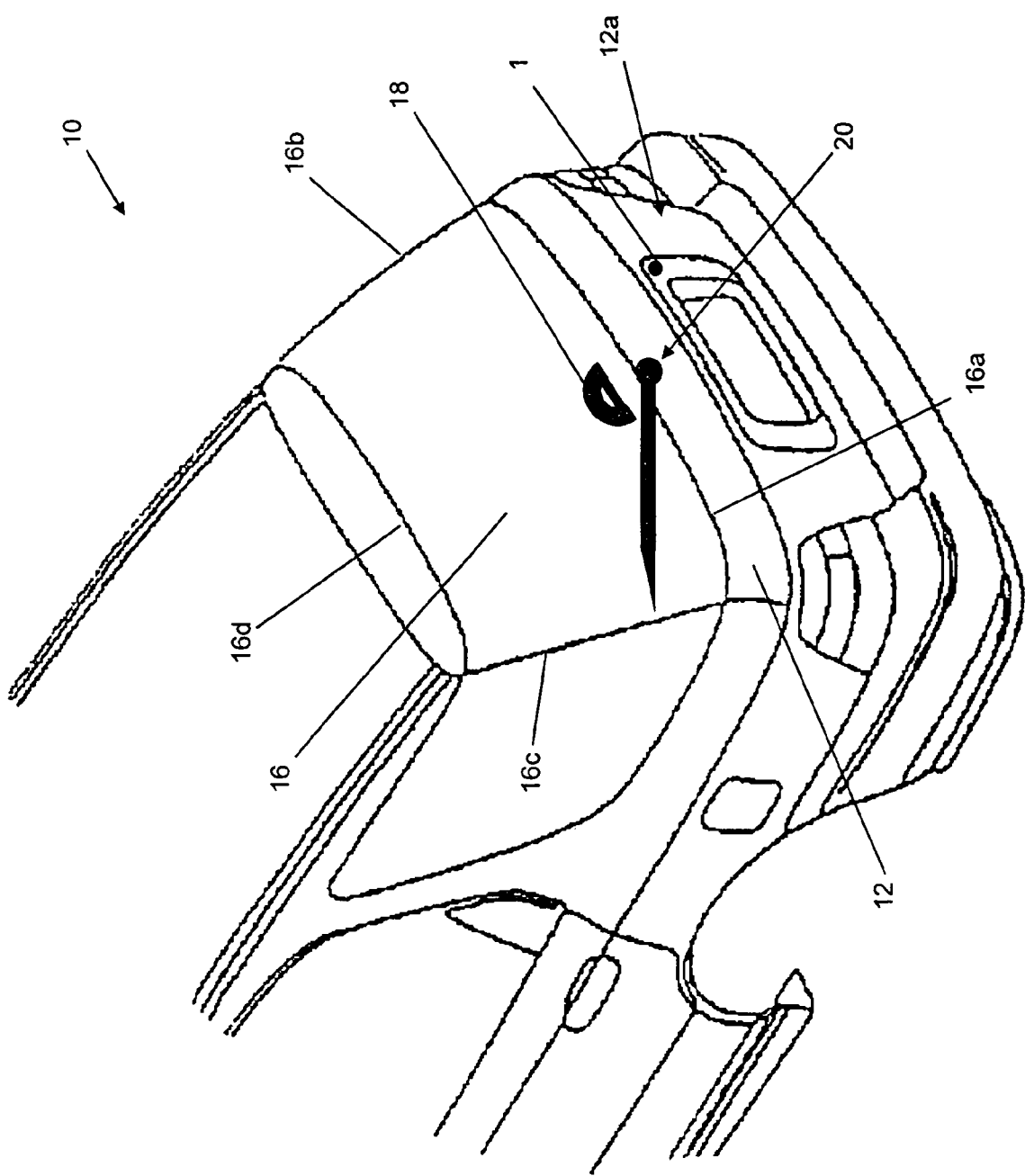
FIG. 1 is a partial perspective view of a vehicle comprising a rear-facing door or tailgate, a flip-glass window, and a rear wiper assembly according to one embodiment of the invention.
Figure 2:
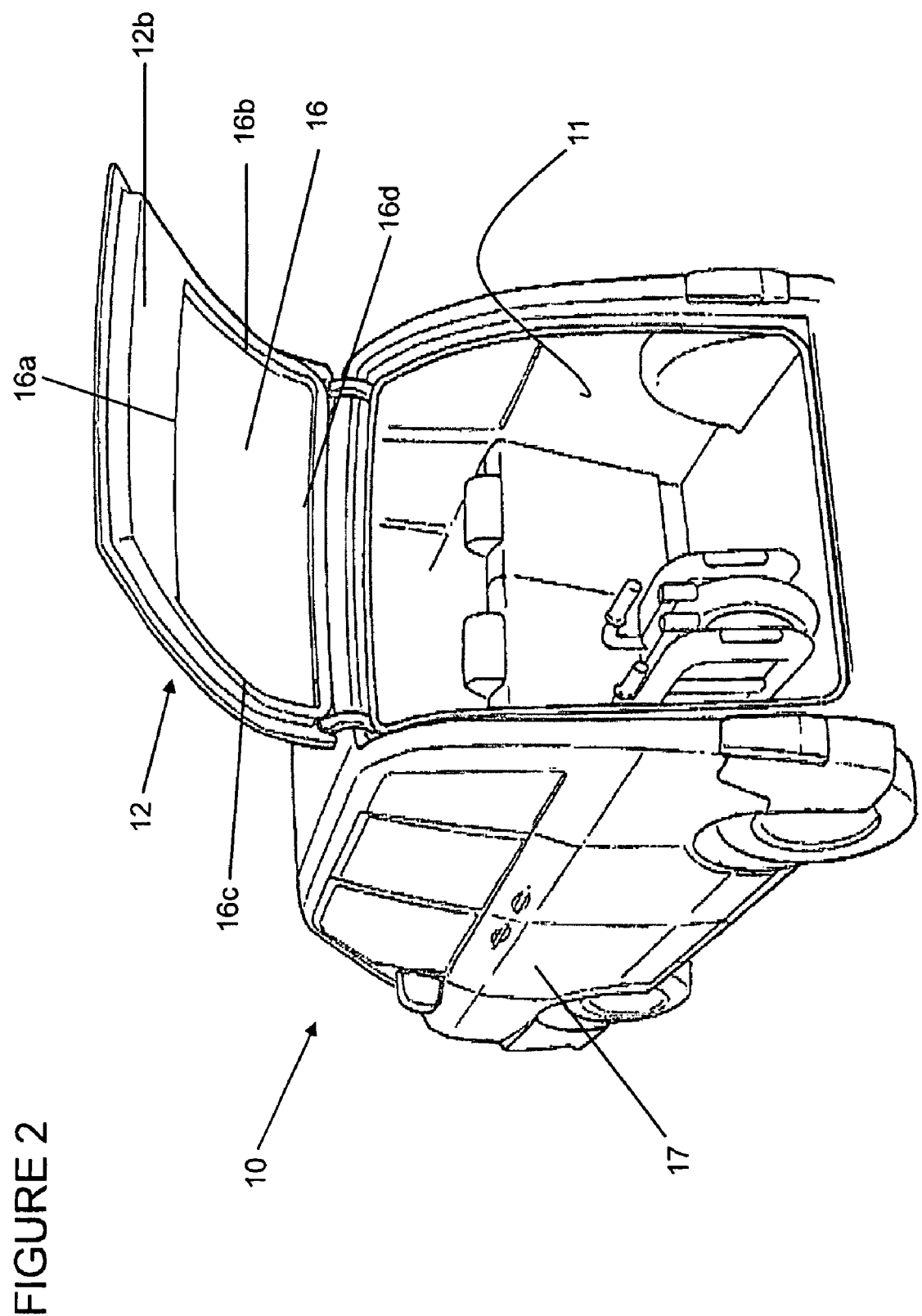
FIG. 2 is a partial perspective view of a vehicle comprising a rear-facing door or tailgate, a flip-glass window, and a rear wiper assembly wherein the rear-facing door or tailgate is in an open position according to one embodiment of the invention.
Figure 3:
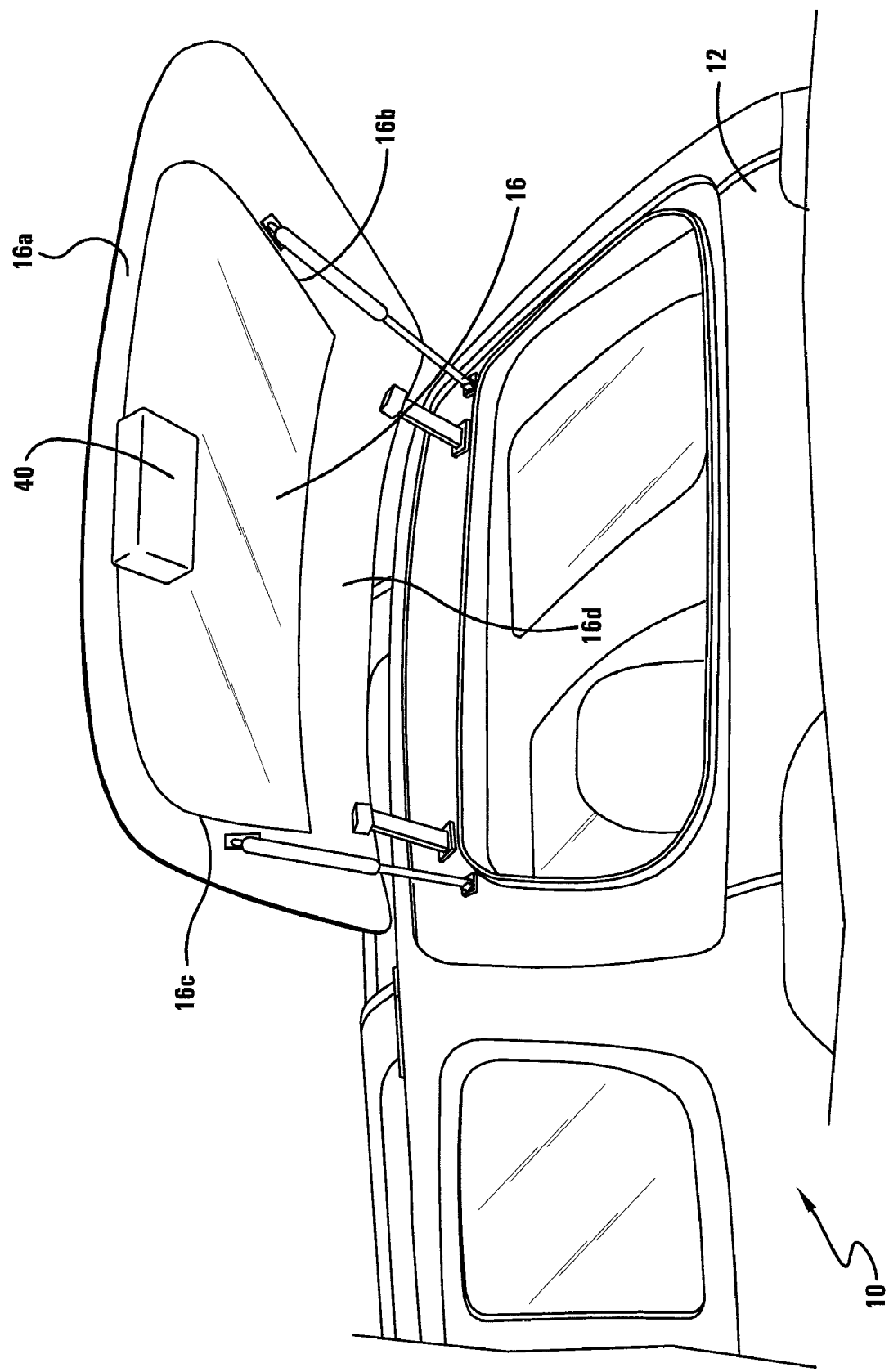
FIG. 3 is a partial perspective view of the vehicle shown in FIG. 2 wherein the flip-glass window is opened independent of the rear-facing door or tailgate according to one embodiment of the invention.
Figure 4:
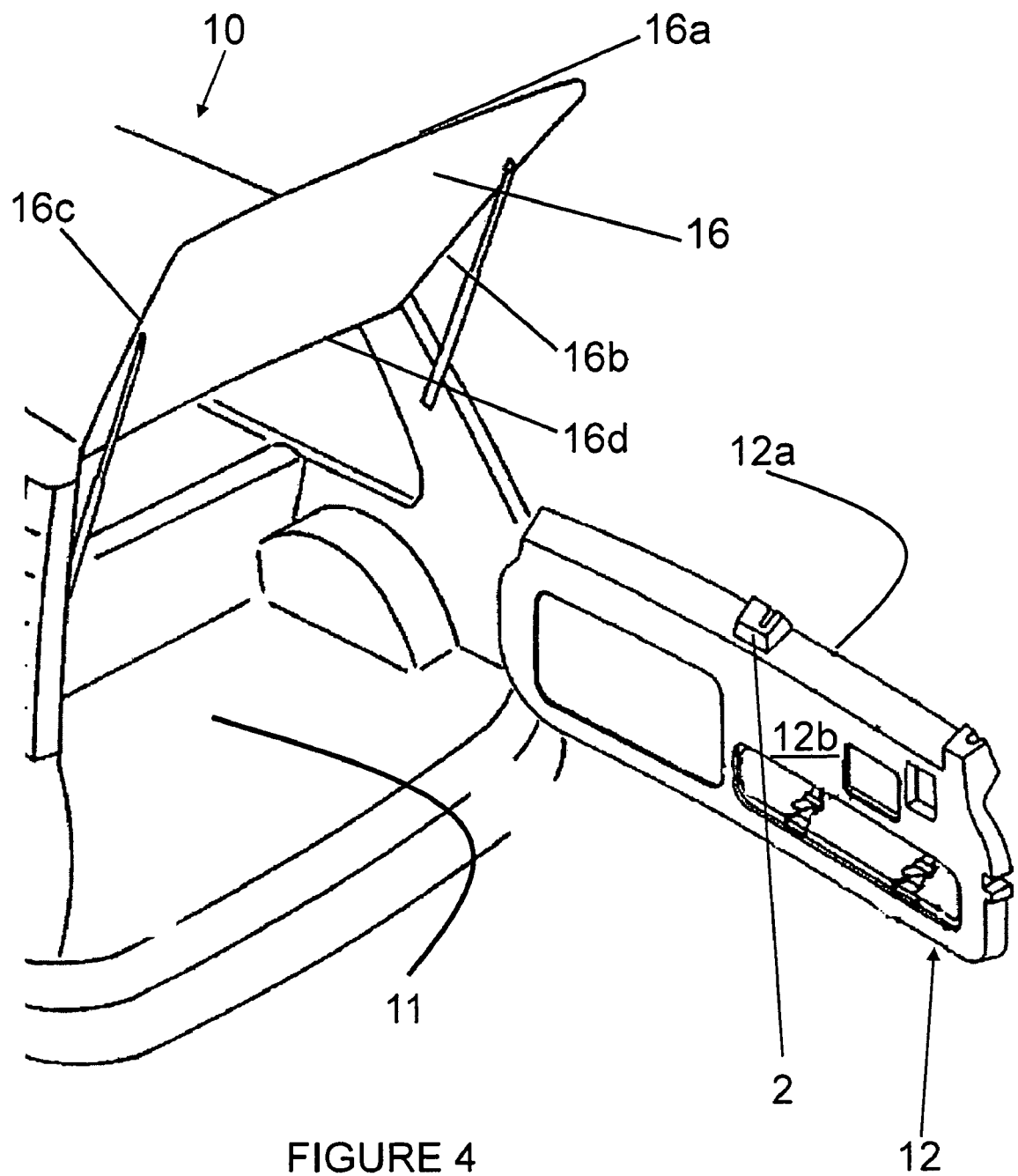
FIG. 4 is a partial perspective view of a vehicle comprising a rear-facing door or tailgate and a flip-glass window showing the flip-glass window and the rear-facing door or tailgate each opened independent of the other according to one embodiment of the invention.
Figure 5:
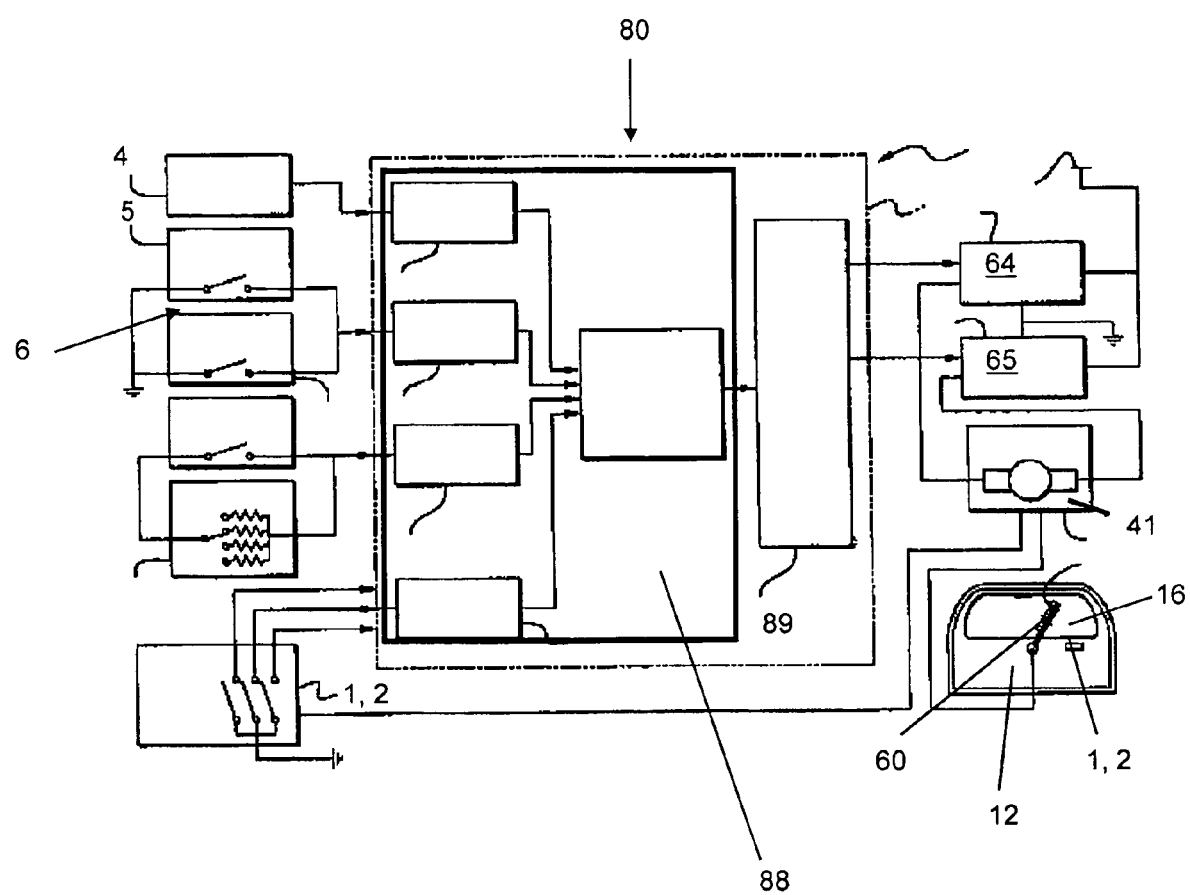
FIG. 5 is a simplified schematic diagram of the rear wiper assembly according to one embodiment of the invention.
Figure 6:
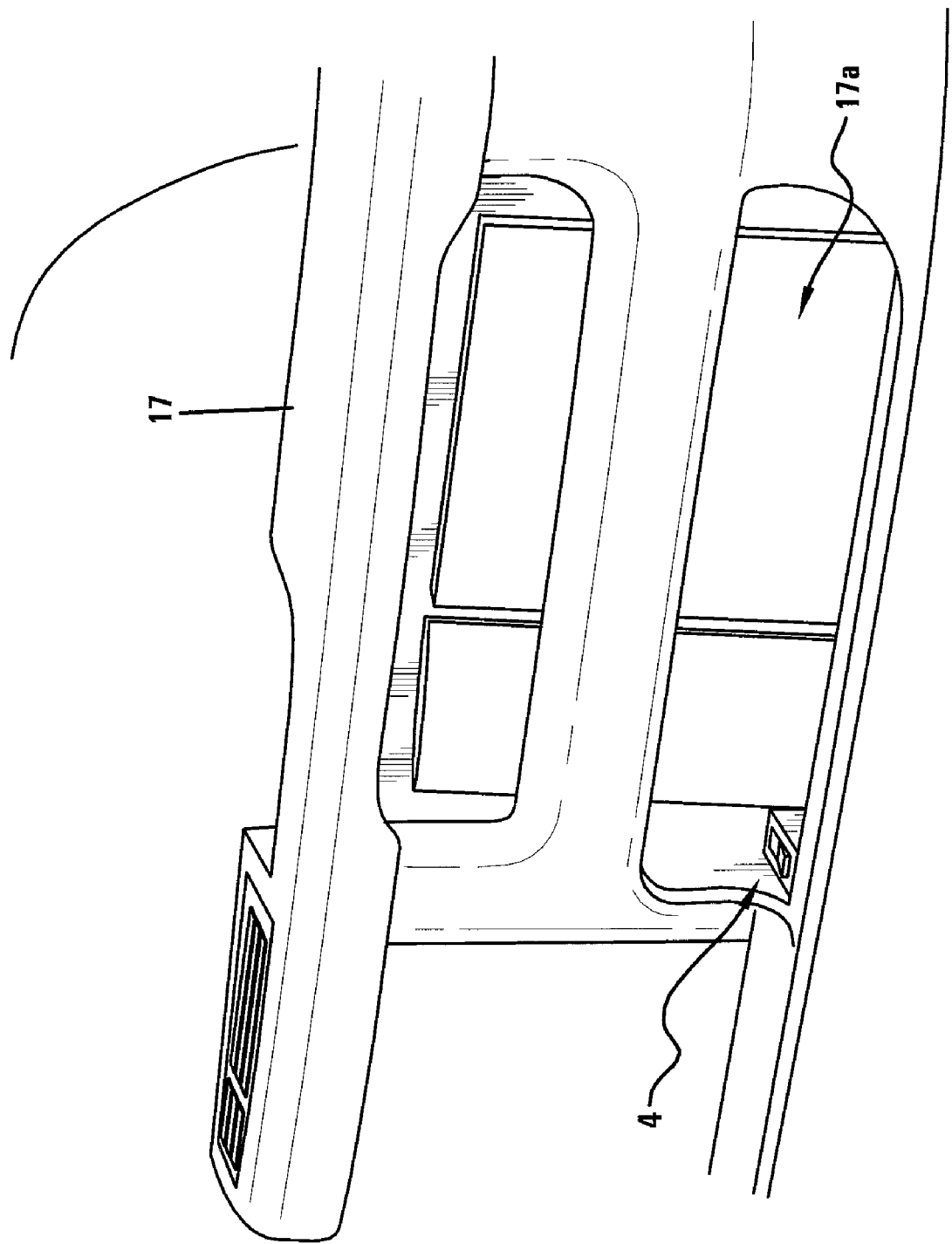
FIG. 6 is a perspective view of a door liner glass hatch switch according to one embodiment of the invention.

Referring now to the drawings wherein the showings are for purposes of illustrating embodiments of the invention only and not for purposes of limiting the same, FIG. 1 shows a vehicle 10 comprising a rear-facing door or tailgate 12 and a rear wiper assembly 20 according to one embodiment of the invention. The rear-facing door or tailgate 12 may comprise a flip-glass hatch or window 16 pivotally coupled to the rear-facing door or tailgate 12. The flip-glass hatch or window 16 may be pivotally coupled to the rear-facing door or tailgate 12 such that the flip-glass hatch or window 16 may be selectively opened either independent of the rear-facing door or tailgate 12 (as shown in FIGS. 3 and 4) or in conjunction with the rear-facing door or tailgate 12 (as shown in FIG. 2). A handle 18 may be coupled to the flip-glass hatch or window 16. The handle 18 may allow an operator to independently open or close the flip-glass hatch or window 16 with respect to the rear-facing door or tailgate 12. The handle 18 may be positioned adjacent to a lower window edge 16a and substantially equidistant between a left window edge 16b and a right window edge 16c. In another embodiment of the invention, the handle 18 may be coupled to the rear-facing door or tailgate 12 below the lower window edge 16a. The handle 18 may be located in any position chosen with sound engineering judgment.

Figure 10:
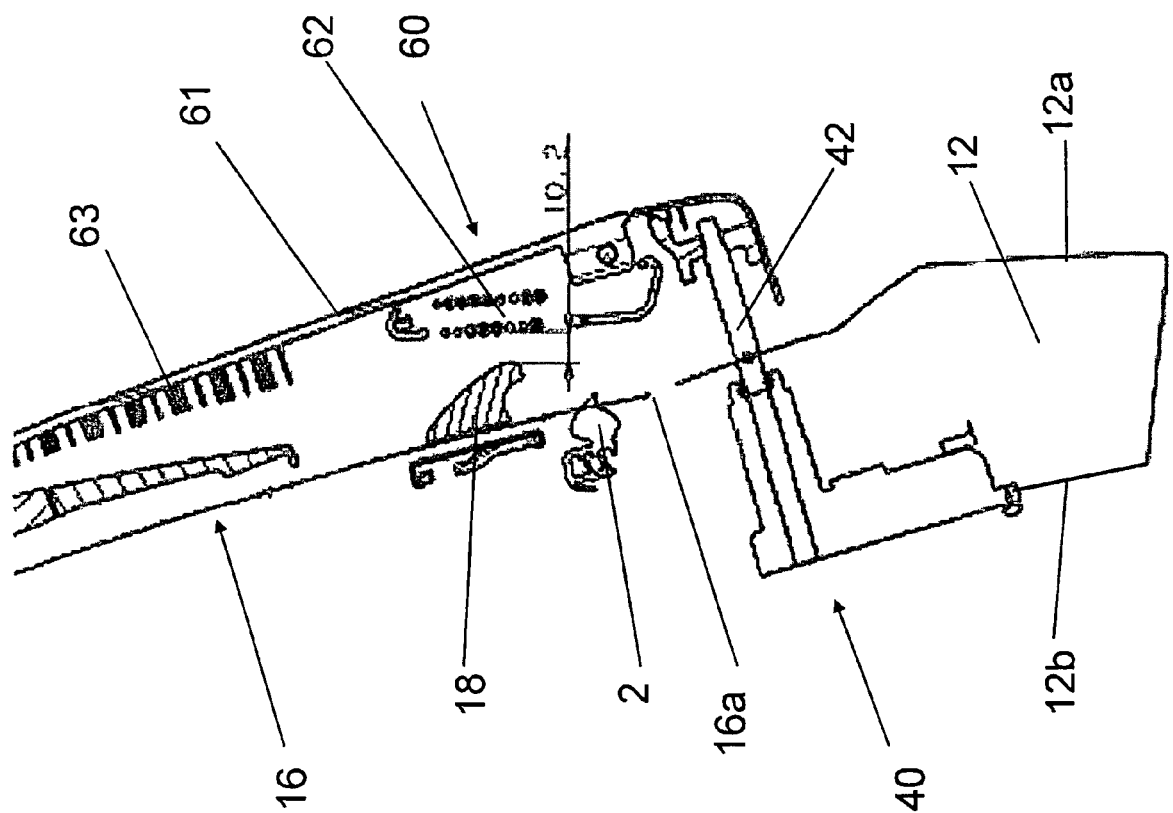
FIG. 10 is a partial perspective view of the rear wiper assembly shown in FIG. 9 along line AA according to one embodiment of the invention.
Figure 11:
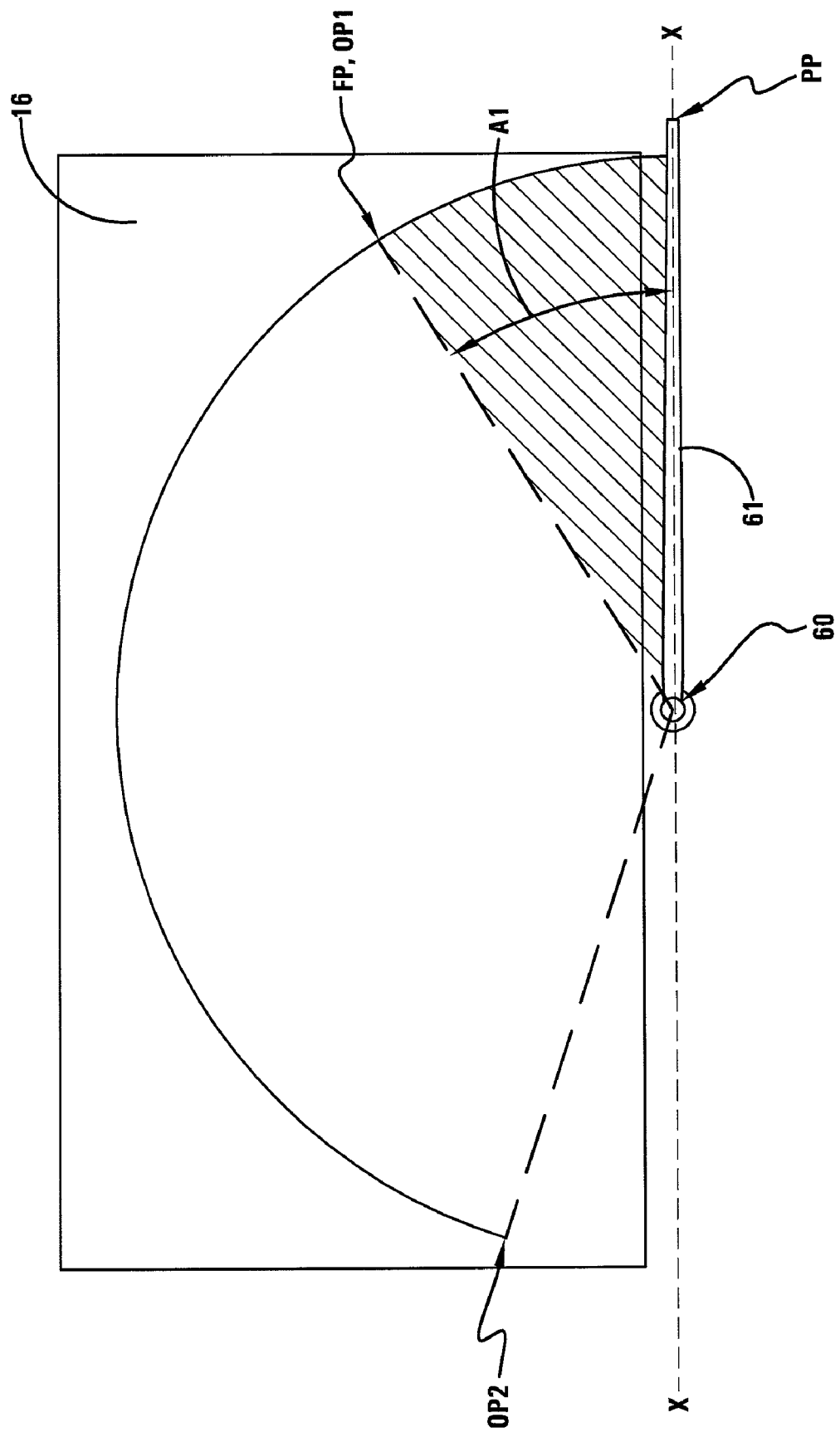
FIG. 11 is a schematic view of a flip-glass window depicting a rear wiper arm positioned in a parked position according to one embodiment of the invention.
Figure 12:
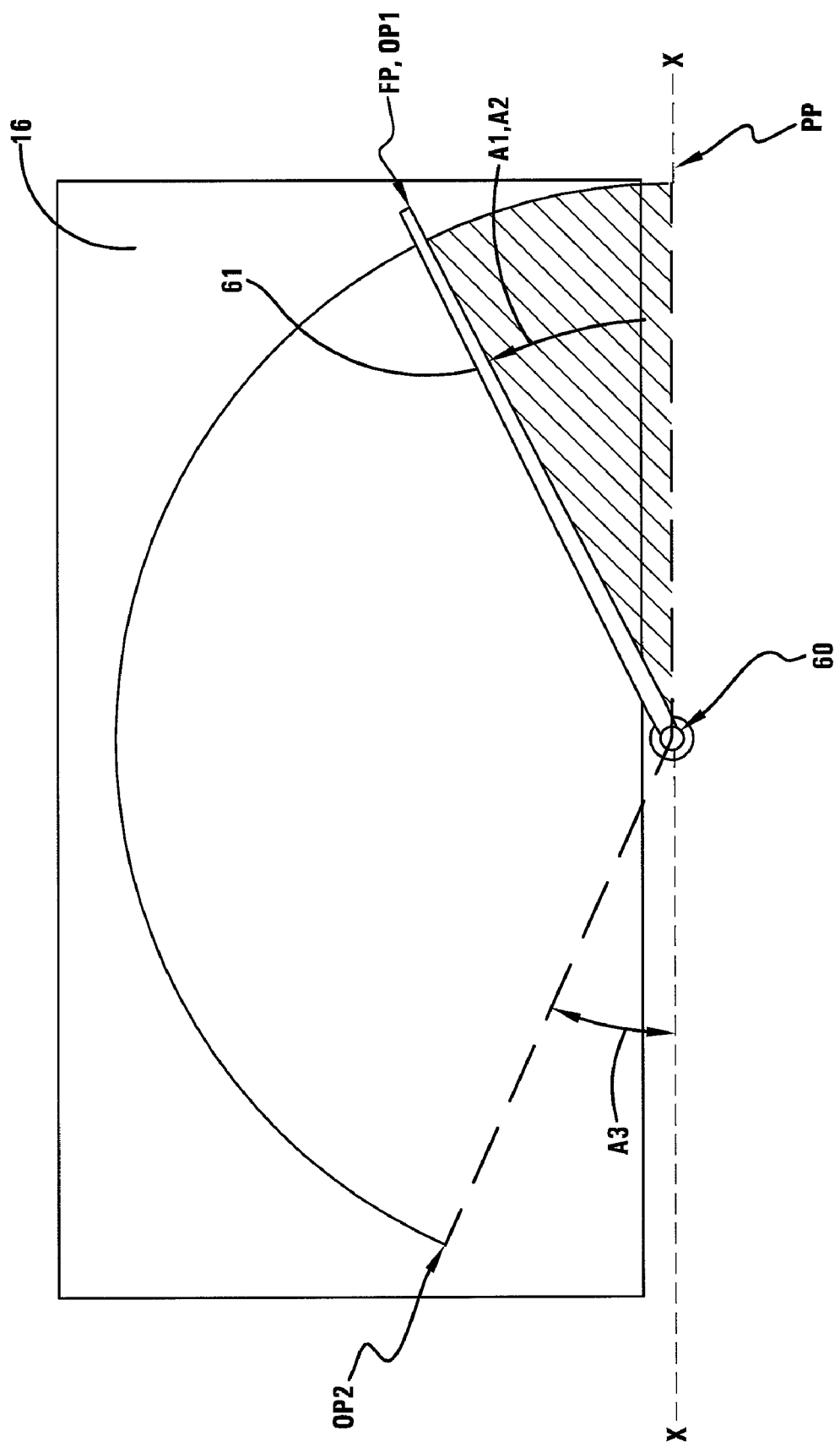
FIG. 12 is a schematic view of a flip-glass window depicting a rear wiper arm moving from a parked position to a first operating position according to one embodiment of the invention.
Figure 13:
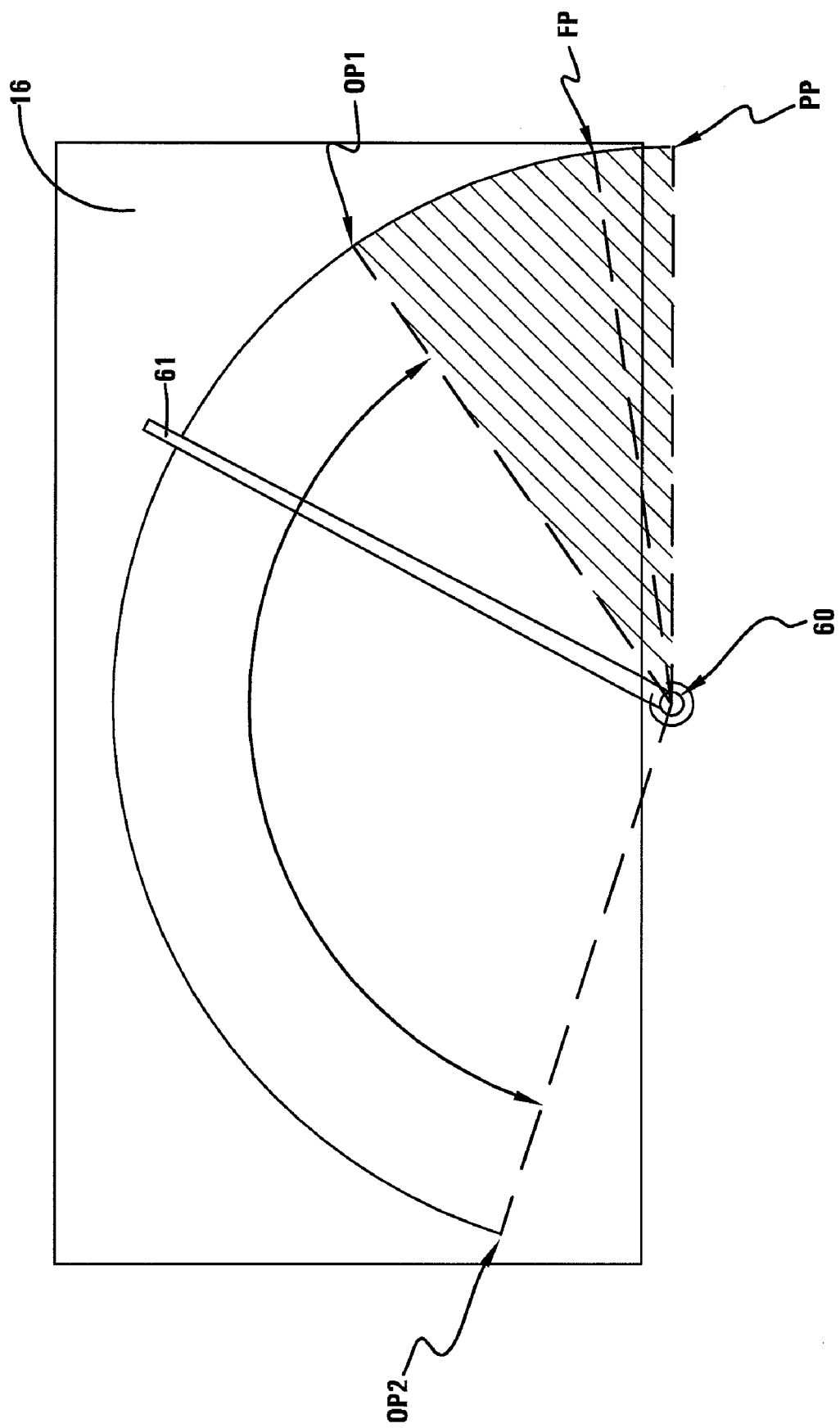
FIG. 13 is a schematic view of a flip-glass window depicting a rear wiper arm oscillating between a first operating position and a second operating position according to one embodiment of the invention.
Figure 14:
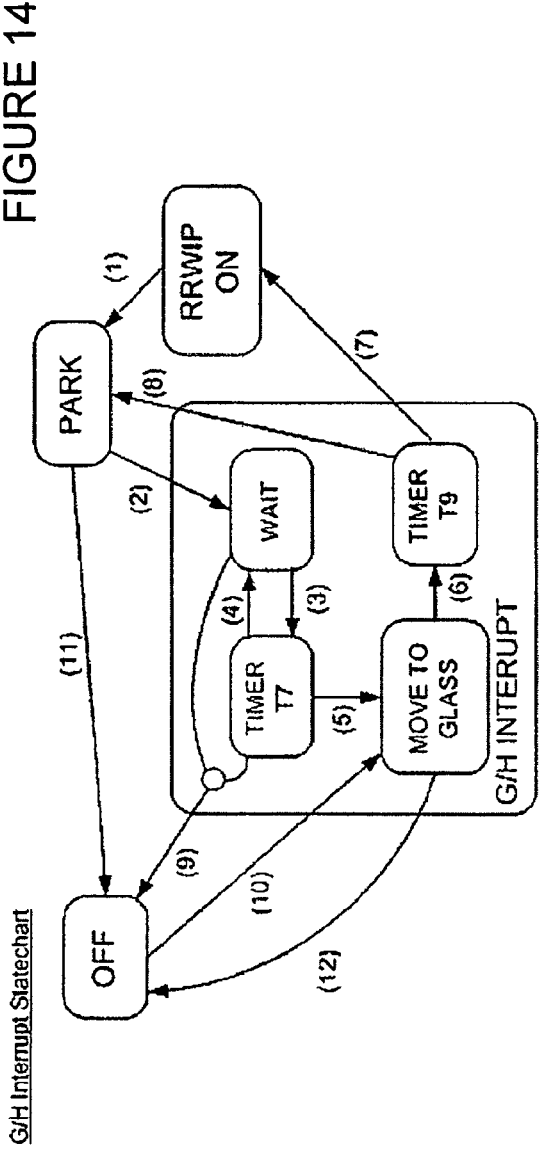
FIG. 14 is a block diagram of a method for controlling the rear wiper assembly according to one embodiment of the invention.
Figure 15:
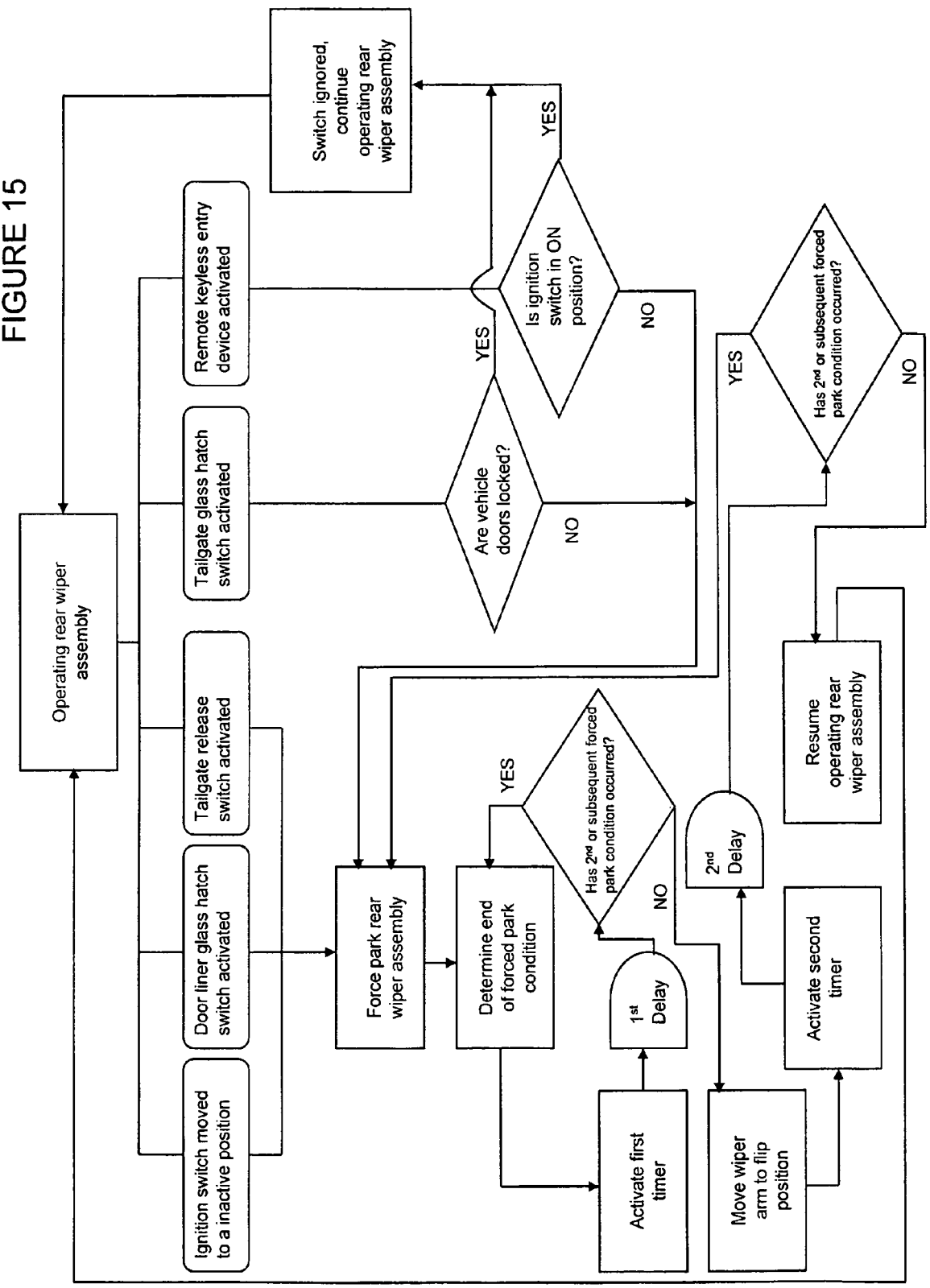
FIG. 15 is a flowchart of a method for controlling the rear wiper assembly according to one embodiment of the invention.

With reference now to FIGS. 1-5, 10-13, the rear wiper assembly 20 may be coupled to the rear-facing door or tailgate 12 adjacent to the lower window edge 16b. In another embodiment of the invention, the rear wiper assembly 20 may be coupled to the rear-facing door or tailgate 12 adjacent to an upper window edge 16d. The rear wiper assembly 20 may comprise an actuator portion 40, a rear wiper arm portion 60, and a control portion 80. The actuator portion 40 may comprise a motor 41 and an output shaft 42. The actuator portion 40 may be coupled to an inside surface 12b of the rear-facing door or tailgate 12 such that the output shaft 42 extends through the rear-facing door or tailgate 12 thereby allowing the rear wiper arm portion to be adjacent to an outer surface of the rear-facing door or tailgate 12 (as shown in FIG. 10). The motor 41 may at least partially cause the output shaft 42 to move from a parked position PP (shown in FIG. 11) to a flip position FP (shown in FIG. 12) and, from a first operating position OP1 to a second operating position OP2 (as shown in FIG. 13).

With continued reference to FIGS. 1-5, 10-13, the parked position PP may comprise a position wherein the rear wiper arm portion 60 is positioned substantially perpendicular to the lower window edge 16a of the flip-glass hatch or window 16. In the parked position PP, the rear wiper arm portion 60 may abut the outer surface 12a of the rear-facing door or tailgate 12 so as not to contact the flip-glass hatch or window 16. In the parked position PP, the rear wiper arm portion 60 does not prevent or otherwise impede the flip-glass hatch or window 16 from being opened or closed independent of the rear-facing door or tailgate 12. The flip position FP may comprise the rear wiper arm portion 60 extending obliquely away from the actuator portion 40 at a first wiper arm angle A1 with respect to a reference line XX. In the flip position FP, the rear wiper arm portion 60 may intersect the lower window edge 16a of the flip-glass hatch or window 16 such that a portion of the rear wiper arm portion 60 contacts the flip-glass hatch or window 16 thereby impeding or preventing the opening of the flip-glass hatch or window 16 independently from the rear-facing door or tailgate 12. The reference line XX may be substantially co-linear with the rear wiper arm portion 60 in the parked position PP. In another embodiment of the invention, the flip position FP may comprise the rear wiper arm portion 60 extending obliquely from the actuator portion 40 such that the rear wiper arm portion 60 remains positioned below the lower window edge 16a of the flip-glass hatch or window 16.

With continued reference to FIGS. 1-5, 10-13, the first operating position OP1 may comprise the rear wiper arm portion 60 extending obliquely away from the actuator portion 40 at a second wiper arm angle A2 with respect to the reference line XX. In the first operating position OP1, the rear wiper arm portion 60 may intersect the lower window edge 16a of the flip-glass hatch or window 16 such that a portion of the rear wiper arm portion 60 contacts the flip-glass hatch or window 16 thereby impeding or preventing the opening of the flip-glass hatch or window 16 independently from the rear-facing door or tailgate 12. In one embodiment of the invention, the second wiper arm angle A2 may be substantially equal to the first wiper arm angle A1. In another embodiment of the invention, the second wiper arm angle A2 may be greater than the first wiper arm angle A1. The second operating position OP2 may comprise the rear wiper arm portion 60 extending obliquely away from the actuator portion 40 at a third wiper arm angle A3 with respect to the reference line XX. The third wiper arm angle A3 may be substantially equal but oppositely oriented to the second wiper arm angle A2. The first operating position OP1 and the second operating position OP2 may be such that the output shaft 42 oscillates from the first operating position OP1 to a second operating position OP2 during normal operation of the rear wiper arm portion 60. In one embodiment of the invention, the first and second operating positions OP1, OP2 may define the outermost lateral limits of the portion of the flip-glass hatch or window 16 that the rear wiper arm portion 60 clears of moisture or other debris. The various wiper arm positions, the parked position PP, the flip position FP, the first operating position OP1, and the second operating position OP2, may be located at any position and may comprise any wiper arm angle chosen with sound engineering judgment.

Figure 8:
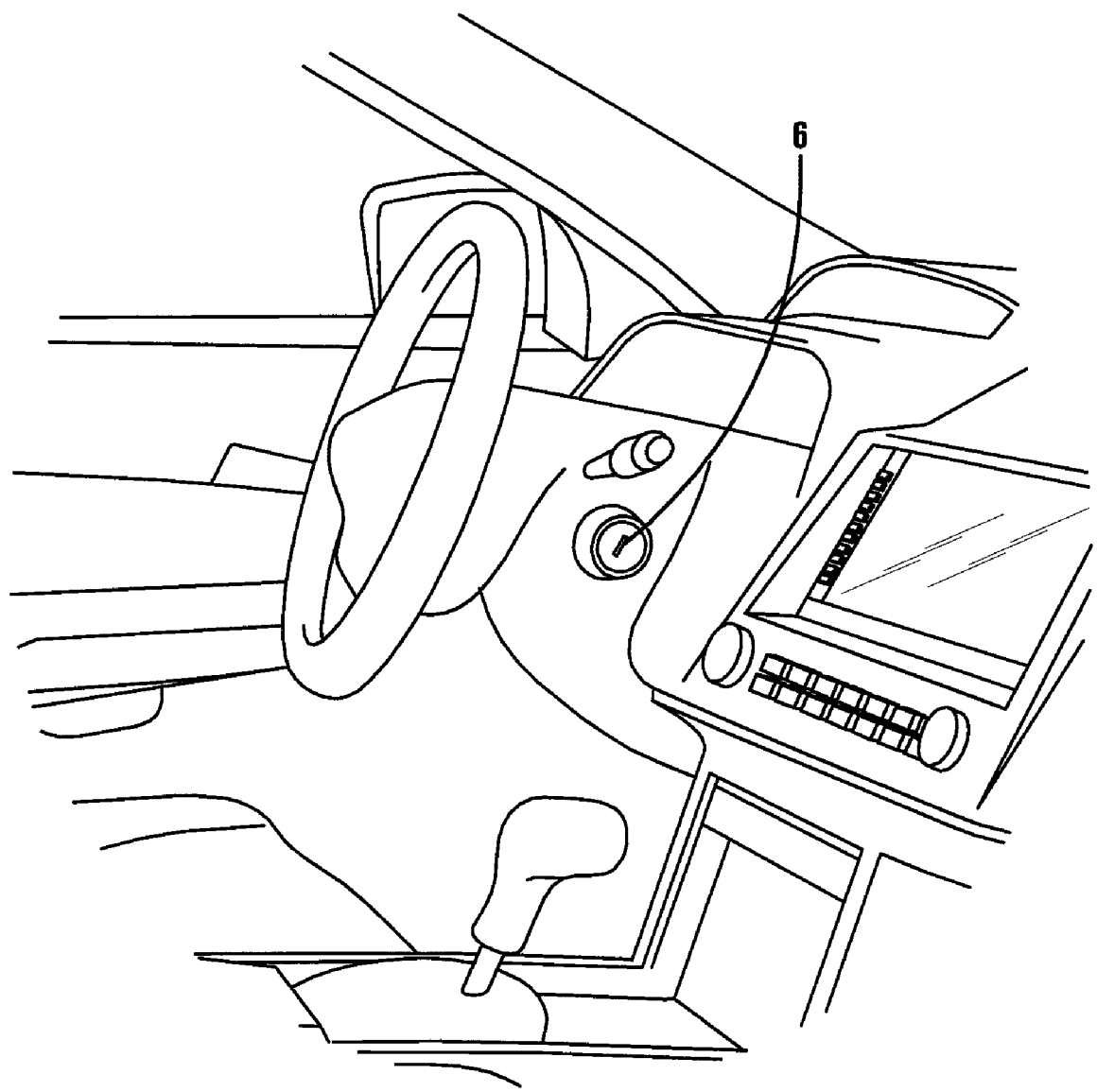
FIG. 8 is a perspective view of an ignition according to one embodiment of the invention.
Figure 9:
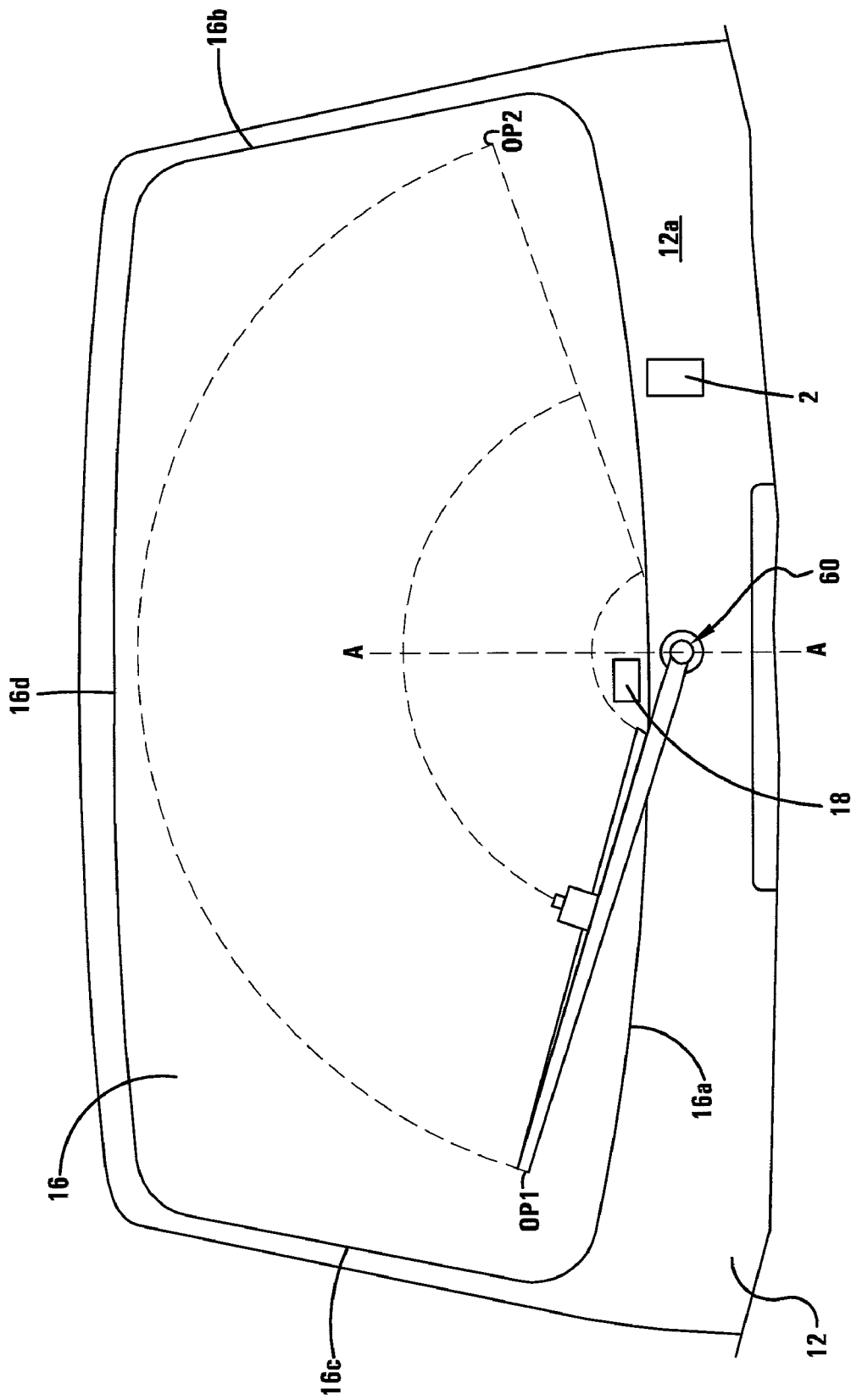
FIG. 9 is a perspective view of a rear wiper assembly according to one embodiment of the invention.

With reference now to FIGS. 8-10, the rear wiper arm portion 60 may comprise a rear wiper shaft 61, a rear wiper curvature 62, and a rear wiper blade 63. The rear wiper shaft 61 may be coupled to the output shaft 42 such that the output shaft 42 may at least partially cause the oscillation or movement of the rear wiper arm portion 60. The rear wiper curvature 62 may extend between the rear wiper shaft 61 and the rear wiper blade 63. The rear wiper curvature 62 may comprise a curved segment that allows the rear wiper arm portion 60 to pass over or across the handle 18 as the rear wiper arm portion 60 oscillates between the first and second operating positions OP1, OP2. In one embodiment of the invention, the rear wiper curvature 62 may additionally comprise a supporting structure that at least partially serves to prevent the deformation of the rear wiper arm portion 60 caused by directional forces or stresses experienced by the rear wiper shaft 61 during the oscillation of the rear wiper arm portion 60 between the first and second operating positions OP1, OP2. The rear wiper blade 63 may comprise a non-abrasive flexible composition, such as a rubber, that extends away from the rear wiper shaft 61 and towards the flip-glass hatch or window 16 as is well known in the art. The rear wiper blade 63 may contact the flip-glass hatch or window 16 such that the oscillation of the rear wiper arm portion 60 between the first and second operating positions OP1, OP2 may cause the rear wiper blade 63 to at least partially remove any water and debris from the flip-glass hatch or window 16.

With reference to FIGS. 4-9, the control portion 80 may comprise a microprocessor 88 and an output driver 89. The microprocessor 88 may process a plurality of input signals in order to determine the presence of a forced park condition. The individual input signals that comprise the plurality of input signals process by the microprocessor 88 may each be generated by one of a plurality of switches for opening or releasing the rear-facing door or tailgate 12 or the flip-glass hatch or window 16. A forced park condition may occur when, during the operation of the rear wiper assembly 20, at least one of a plurality of switches for opening or releasing the rear-facing door or tailgate 12 or the flip-glass hatch or window 16 becomes activated or engaged. The forced park condition may be terminated when all of the plurality of switches for opening or releasing the rear-facing door or tailgate 12 or the flip-glass hatch or window 16 becomes deactivated or disengaged. Each of the plurality of switches for opening or releasing the rear-facing door or tailgate 12 or the flip-glass hatch or window 16 may be deactivated or disengaged when the rear-facing door or tailgate 12 and the flip-glass hatch or window 16 are in a fully closed position.

With continued reference to FIGS. 4-9, in one embodiment of the invention, the rear-facing door or tailgate 12 may comprise a tailgate release switch 1. The tailgate release switch 1 may become activated or engaged by the insertion and turning of a key 5 (shown in FIG. 7). The key 5 may be inserted and turned in a first direction to open or release the rear-facing door or tailgate 12 in conjunction with the flip-glass hatch or window 16 (as shown in FIG. 2) and may be inserted and turned in a second direction to open or release the flip-glass hatch or window 16 independent of the rear-facing door or tailgate 12 (as shown in FIG. 3). The tailgate release switch 1 may be positioned on the outer surface 12*a* of the rear-facing door or tailgate 12 thereby allowing an operator to selectively cause the opening of the rear-facing door or tailgate 12 or the flip-glass hatch or window 16 from a position located outside of the vehicle 10. The rear-facing door or tailgate 12 may further comprise a tailgate glass hatch switch 2. The tailgate glass hatch switch 2 may be located on the inside surface 12*b* of the rear-facing door or tailgate 12 thereby allowing an operator located within a rear interior portion 11 of the vehicle 10 to open the flip-glass hatch or window 16 independent of the rear-facing door or tailgate 12. In one embodiment of the invention, the tailgate glass hatch switch 2 may comprise a lever and may become activated or engaged by the manipulation of the lever in an upward direction.

Figure 7:
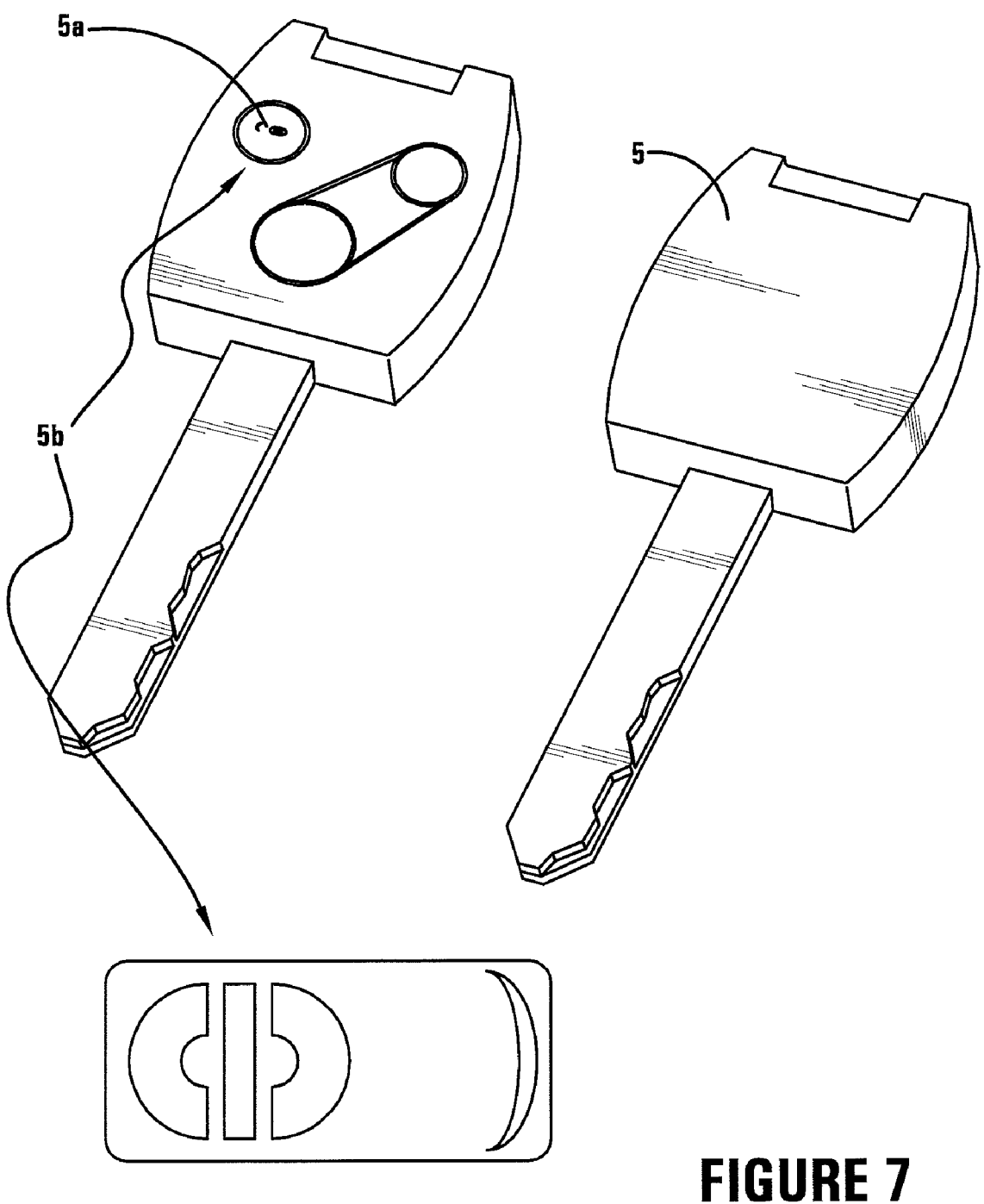
FIG. 7 is a perspective view of a remote keyless entry device used to open or release a flip-glass window according to one embodiment of the invention.

With continued reference to FIGS. 4-9, the vehicle 10 may comprise a door-hatch switch 4. The activation or engagement of the door-hatch switch 4 may cause the flip-glass hatch or window 16 to open independent of the rear-facing door or tailgate 12, thereby constituting a forced park condition. The door-hatch switch 4 may be positioned, in one non-limiting example, within a map pocket portion 17*a* of a front driver's side door 17 (shown in FIG. 2). Additionally, the activation or engagement of a glass hatch switch 5*a* may also cause the flip-glass hatch or window 16 to open independent of the rear-facing door or tailgate 12. The glass hatch switch 5*a* may be located, in one non-limiting example, on a remote keyless entry device 5*b*. In one embodiment of the invention, the remote keyless entry device 5*b* may be located within the key 5. In another embodiment of the invention, the remote keyless entry device 5*b* may be independent from the key 5 (as shown in FIG. 7). During the operation of the rear wiper assembly 20, the movement of an ignition switch 6 from an active position, such as the run or accessory position, to an inactive position, such as the off or start position, may also constitute a forced park condition. In one embodiment of the invention, the ignition switch 6 may be moved from an active position to an inactive position via the key 5 that has been inserted into the ignition switch 6.

With reference now to FIG. 4, 13-15, the microprocessor 88 may be in electrical communication with the output driver 89. The output driver 89 may generate an output signal to control the actuator portion 40 and the rear wiper arm portion 60. According to one embodiment of the invention, upon detecting a forced park condition during the operation of the rear wiper assembly 20, the microprocessor 88 may cause the output driver 89 to generate an output signal that deactivates a rear wiper up relay 64 and activates a rear wiper down relay 65 causing the wiper arm portion 60 to move out of contact with the flip-glass window 16 and into the parked position PP. Upon termination of the forced park condition, the microprocessor 88 may activate a first timer T1 causing a first delay D1. The first delay D1 may range from about 1 second to about 5 seconds in length. In a more specific embodiment of the invention, the first delay D1 may be about 4 seconds in length. If, during the first delay D1, the microprocessor 88 determines a second or subsequent forced park condition, the first timer T1 may be deactivated, thereby terminating the first delay D1. The first timer T1, and therefore the first delay D1, may be subsequently restarted upon the termination of the second or subsequent forced park condition. Upon the expiration of the first delay D1, the microprocessor 88 may then cause the output driver 89 to generate an output signal that activates the rear wiper up relay 64 causing the wiper arm portion 60 to move to the flip position FP.

With continued reference to FIG. 4, 13-15, upon the rear wiper arm portion 60 moving to the flip position FP, the microprocessor 88 may activate a second timer T2 causing a second delay D2. The second delay D2 may range from about 1 second to about 5 seconds. In a more specific embodiment of the invention, the second delay D2 may be about 3 seconds. If, during the second delay D2, the microprocessor 88 determines a second or subsequent forced park condition, the second timer T2 may be deactivated thereby terminating the second delay D2. The output driver 89 may then generate an output signal causing the rear wiper arm portion 60 to move from the flip position FP to the parked position PP. Upon the termination of the second or subsequent forced park condition, the first timer T1 may be activated and the process for resuming operation of the rear wiper assembly 20 may be restarted. Upon the expiration of the second delay D2, the microprocessor 88 may cause the output driver 89 to activate and deactivate the rear wiper up relay 64 and the rear wiper down relay 65 respectively such that the rear wiper arm portion 60 is caused to oscillate from the first operating position OP1 to the second operating position OP2, resuming the normal operation of the rear wiper assembly 20.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method comprising the steps of:
  (a) providing a vehicle comprising a rear-facing door and a rear wiper assembly, wherein the rear-facing door comprises a flip-glass window that is at least partially cleared of moisture or debris during operation of the rear wiper assembly;
  (b) operating the rear wiper assembly by oscillating a rear wiper arm between a first position and a second position, wherein the first position comprises the rear wiper arm intersecting a lower window edge of the flip-glass window at a first wiper arm angle and the second position comprises the rear wiper arm intersecting the lower window edge of the flip-glass window at a second wiper arm angle;
  (c) processing a plurality of input signals, wherein the plurality of input signals are indicative of a vehicle ignition status, a flip-glass window status, and a rear-facing door status;
  (d) detecting a first forced park condition based upon the plurality of input signals;
  (e) in response to step (d) moving the rear wiper arm into a parked position, wherein the rear wiper arm abuts an outer surface of the rear-facing door and is out of contact with the flip-glass window;
  (f) in response to step (e) determining the termination of the first forced park condition;
  (g) in response to step (f) initiating a first timer, wherein the first timer causes a first delay;
  (h) moving the rear wiper arm into a flip position upon the expiration of the first delay, wherein the flip position comprises the rear wiper arm intersecting the lower window edge of the flip-glass window at a third wiper arm angle;
  (i) in response to step (h) initiating a second timer, wherein the second timer causes a second delay; and,
  (j) resuming the operation of the rear wiper assembly upon the expiration of the second delay.

2. The method of claim 1, wherein the first delay comprises a longer time period than the second delay.

3. The method of claim 1, wherein the first delay is about 4 seconds in duration and the second delay is about 3 seconds in duration.

4. The method of claim 1, wherein the first delay ranges from about 1 second to about 5 seconds in duration.

5. The method of claim 1, wherein the second delay ranges from about 1 second to about 5 seconds in duration.

6. The method of claim 1, wherein the first delay and the second delay comprise substantially equal time periods.

7. The method of claim 1, wherein the first wiper arm angle is substantially the same as the third wiper arm angle.

8. The method of claim 1, wherein step (j) further comprises the step of:
   determining that a second forced park condition has not occurred during either the first or the second delay.

9. The method of claim 1, wherein the first wiper arm angle is greater than the third wiper arm angle.

10. A method comprising the steps of:
    (a) providing a vehicle comprising a rear-facing door and a rear wiper assembly, wherein the rear-facing door comprises a flip-glass window that is at least partially cleared of moisture or debris during operation of the rear wiper assembly;
    (b) operating the rear wiper assembly by oscillating a rear wiper arm between a first position and a second position, wherein the first position comprises the rear wiper arm intersecting a lower window edge of the flip-glass window at a first wiper arm angle and the second position comprises the rear wiper arm intersecting the lower window edge of the flip-glass window at a second wiper arm angle wherein the second wiper arm angle is substantially equal to but oppositely oriented from the first wiper arm angle;
    (c) processing a plurality of input signals, wherein the plurality of input signals are indicative of a vehicle ignition status, a flip-glass window status, and a rear-facing door status;
    (d) detecting a first forced park condition based upon the plurality of input signals;
    (e) moving the rear wiper arm into a third position, wherein the rear wiper arm abuts an outer surface of the rear-facing door and is out of contact with the flip-glass window;
    (f) determining the termination of the first forced park condition;
    (g) initiating a first timer, wherein the first timer causes a first delay;
    (h) moving the rear wiper arm into a fourth position upon the expiration of the first delay, wherein the fourth position comprises the rear wiper arm intersecting the lower window edge of the flip-glass window at a third wiper arm angle;
    (i) initiating a second timer, wherein the second timer causes a second delay; and,
    (j) resuming the operation of the rear wiper assembly upon the expiration of the second delay; and,
    wherein step (j) further comprises the step of: determining that a second forced park condition has not occurred during either the first or the second delay.

11. The method of claim 10, wherein the first delay comprises a longer time period than the second delay.

12. The method of claim 10, wherein the first delay is about 4 seconds in duration and the second delay is about 3 seconds in duration.

13. The method of claim 10, wherein the first delay ranges from about 1 second to about 5 seconds in duration.

14. The method of claim 10, wherein the second delay ranges from about 1 second to about 5 seconds in duration.

15. A method comprising the steps of:
    (a) providing a vehicle comprising a rear-facing door and a rear wiper assembly, wherein the rear-facing door comprises a flip-glass window that is at least partially cleared of moisture or debris during operation of the rear wiper assembly;
    (b) operating the rear wiper assembly by oscillating a rear wiper arm between a first position and a second position wherein the first position comprises the rear wiper arm intersecting a lower window edge of the flip-glass window at a first wiper arm angle and the second position comprises the rear wiper arm intersecting the lower window edge of the flip-glass window at a second wiper arm angle wherein the second wiper arm angle is substantially equal to but oppositely oriented from the first wiper arm angle;
    c) processing a plurality of input signals, wherein the plurality of input signals are indicative of a vehicle ignition status a flip-glass window status, and a rear-facing door status;
    (d) detecting a first forced park condition based upon the plurality of input signals;
    (e) moving the rear wiper arm into a third position, wherein the rear wiper arm abuts an outer surface of the rear-facing door and is out of contact with the flip-glass window;
    (f) determining the termination of the first forced park condition;
    (g) initiating a first timer, wherein the first timer causes a first delay;
    (h) moving the rear wiper arm into a fourth position upon the expiration of the first delay, wherein the fourth position comprises the rear wiper arm intersecting the lower window edge of the flip-glass window at a third wiper arm angle;
    (i) initiating a second timer, wherein the second timer causes a second delay; and,
    (j) resuming the operation of the rear wiper assembly upon the expiration of the second delay; and,
    wherein the first wiper arm angle is greater than the third wiper arm angle.

16. The method of claim 15, wherein step (j) further comprises the step of:
    determining that a second forced park condition has not occurred during either the first or the second delay.

17. The method of claim 15, wherein the first delay comprises a longer time period than the second delay.

18. The method of claim 15, wherein the first delay is about 4 seconds in duration and the second delay is about 3 seconds in duration.

19. The method of claim 15, wherein the first delay ranges from about 1 second to about 5 seconds in duration.

20. The method of claim 15, wherein the second delay ranges from about 1 second to about 5 seconds in duration.

* * * * *